US006509409B1

(12) United States Patent
Thetford

(10) Patent No.: US 6,509,409 B1
(45) Date of Patent: Jan. 21, 2003

(54) POLYURETHANE DISPERSANTS

(75) Inventor: Dean Thetford, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 09/674,272

(22) PCT Filed: Apr. 26, 1999

(86) PCT No.: PCT/GB99/01293

§ 371 (c)(1),
(2), (4) Date: Oct. 30, 2000

(87) PCT Pub. No.: WO99/56864

PCT Pub. Date: Nov. 11, 1999

(30) Foreign Application Priority Data

Apr. 30, 1998 (GB) ................................. 9809257

(51) Int. Cl.$^7$ .............................. C08J 3/00; C08K 3/20; C08L 75/00; C08G 18/32; C08G 18/38
(52) U.S. Cl. ...................... 524/589; 524/590; 524/591; 524/839; 524/840; 528/44; 528/60; 528/65; 528/66; 528/73; 528/80; 528/81; 528/84; 528/85
(58) Field of Search ................................. 524/589, 590, 524/591, 839, 840; 528/44, 60, 65, 66, 73, 80, 81, 84, 85

(56) References Cited

U.S. PATENT DOCUMENTS

| 3,806,495 | A | | 4/1974 | Schoen |
| 3,817,944 | A | | 6/1974 | Jones |
| 4,051,111 | A | | 9/1977 | Holloway |
| 5,342,891 | A | * | 8/1994 | Koleske et al. ............. 525/162 |

FOREIGN PATENT DOCUMENTS

| DE | 35 27 038 | 1/1987 |
| EP | 0 154 678 | 9/1985 |
| EP | 0 270 126 | 6/1988 |
| EP | 0 318 999 | 6/1989 |
| EP | 0 520 586 | 12/1992 |
| WO | WO 97/26984 | 7/1997 |

* cited by examiner

Primary Examiner—Patrick D. Niland
(74) Attorney, Agent, or Firm—Pillsbury Winthrop LLP

(57) ABSTRACT

A dispersant comprising the addition product of a polyisocyanate having an average functionality of from 2 to 10 and one or more poly(oxyalkylene carbonyl) chains (POAC chain) such as those containing a POAC chain derived from ε-caprolactone and δ-valerolactone. The dispersants are used to disperse pigments in paints and printing inks.

33 Claims, No Drawings

POLYURETHANE DISPERSANTS

This application is the national phase of international application PCT/GB99/01293 filed Apr. 26, 1999 which designated the U.S.

The present invention relates to dispersing agents derived from a polyisocyanate and at least one poly(oxyalkylenecarbonyl) chain derived from two or more different hydroxycarboxyylic acids or lactones thereof.

U.S. Pat. No. 4,647,647 discloses dispersants made by reacting a polyisocyanate having an average functionality of from 2.5 to 6 with a monohydroxy compound containing O and COOH groups. Examples of monohydroxy compounds include the reaction products of heptadecafluorodecanol, 2-ethylhexanol and valerolactone; and the reaction product of caprolactone with the following hydroxy compounds as polymerisation terminating groups: phenylethylalcohol, n-octanol, isononanol, nonylphenolethyoxylate (MW 445), trimethylolpropane and 1,4-butanediol. These dispersants are said to resist reagglomeration of solids after the dispersion process, to give high gloss in lacquers and coatings, high colour in pigmented plastics and good mechanical strength in reinforced plastics.

U.S. Pat. No. 4,795,790 discloses similar polyisocyanate derived dispersants which contain either acidic, basic or alkoxysilane groups.

U.S. Pat. No. 5,399,294 and U.S. Pat. No. 5,425,900 also disclose similar polyisocyanate derived dispersants which additionally contain a compound having at least one basic ring nitrogen atom and an isocyanate-reactive group.

WO 97/26984 also discloses polyisocyanate derived dispersants containing a 2 0 cyclic group having a ring nitrogen which is derived from an acrylate or epoxide.

In so far as these dispersants contain a poly(oxyalkylenecarbonyl) chain such chains are derived from a single hydroxycarboxylic acid or lactone thereof.

It has now been found that improved dispersants can be obtained by incorporating a poly(oxyalkylenecarbonyl) chain obtainable from two or more different hydroxy carboxylic acids or lactones thereof. In many instances, the dispersants also exhibit improved solubility compared with similar dispersants containing a poly(oxyalkylenecarbonyl) chain derived from a single hydroxy carboxylic acid or lactone thereof.

According to the invention there is provided a dispersant comprising the addition reaction product of a polyisocyanate having an average functionality of from 2 to 10 and one or more poly(oxyalkylenecarbonyl) chains derivable from two or more different hydroxy carboxylic acids or lactones thereof, including their salts. (Hereinafter "The Dispersant").

Polyisocyanates having an average functionality of from 2 to 6 are preferred.

It is particularly preferred that the polyoxyalkylene chain is derivable from two different hydroxycarboxylic acids or lactones thereof.

Preferably, the poly(oxyalkylenecarbonyl) chain (hereinafter POAC chain) contains $C_{1-17}$-alkylene groups. The nature of the chain length can be varied between wide limits depending on whether the dispersant is to be used to disperse a particulate solid in a polar or non-polar medium. Thus, when the dispersant is to be used to disperse a particulate solid in a non-polar medium, preferably one or more of the hydroxy carboxylic acids contains a $C_{7-17}$-alkylene group and when the dispersant is to be used to disperse a particulate solid in a polar medium it is preferred that one or more and especially all of the hydroxy carboxylic acids or lactones thereof contains a $C_{1-6}$-alkylene group.

The hydroxy carboxylic acids may be linear or branched, saturated or unsaturated. Preferably, the hydroxy carboxylic acid is saturated.

Examples of hydroxy carboxylic acids containing a $C_{7-17}$-alkylene group are ricinoleic, 12-hydroxystearic, 12-hydroxydodecanoic, 5-hydroxydodecanoic, 5-hydroxydecanoic and 4-hydroxydecanoic acids.

Examples of hydroxy carboxylic acids containing a $C_{1-6}$-alkylene group are glycolic, 5-hydroxyvaleric and 6-hydroxycaproic acid.

When the POAC chain contains one or more $C_{1-6}$-alkylene groups it is preferably obtained by polymerising one or more lactones. Examples of lactones are propiolactone, butyrolactone, valerolactone and caprolactone. It is particularly preferred that the lactone is δ-valerolactone or ε-caprolactone which is optionally substituted by $C_{1-8}$-alkyl more preferably $C_{1-6}$-alkyl and especially $C_{1-4}$-alkyl. Examples of such alkyl groups are methyl and tertiary butyl. Particularly useful effects have been obtained where the POAC chain is obtained by copolymerising δ-valerolactone and ε-caprolactone.

The alkyl-substituted ε-caprolactones are obtainable by oxidation of alkyl-substituted cyclohexanones and consequently many are mixtures of alkyl-substituted ε-caprolactone. Thus, the oxidation of 2-methyl cyclohexanone often results in a mixture of 7-methyl (95%) and 3-methyl (5%) ε-caprolactone. However, the oxidation of 4-alkyl cyclohexanone results only in the 5-alkyl ε-caprolactone. Other examples of alkyl substituted ε-caprolactone are 6-methyl; 4-methyl; 5-methyl; 5-tertiary butyl; 4,6,6-trimethyl and 4,4,6-trimethyl derivatives. 7-methyl ε-caprolactone is preferred.

Copolymerisation of the hydroxy carboxylic acid or lactone thereof results in a POAC chain having a terminal hydroxy group and a terminal carboxylic acid group. (Hereinafter POAC compound). The POAC compound may be reacted at either the hydroxy and/or carboxylic acid group with a compound containing a functional group which undergoes an additional reaction with isocyanates such as hydroxy, thiol or amino groups. It is preferred, however, that the POAC compound undergoes an addition reaction with the polyisocyanate via the hydroxy group of the POAC compound. The POAC chain may be prepared by first reacting a hydroxy carboxylic acid with the isocyanate group(s) of the polyisocyanate followed by copolymerisation with additional hydroxy carboxylic acid or lactone thereof to build the POAC chain. However, it is preferable to first prepare the POAC compound and to react this with the isocyanate group(s) of the polyisocyanate. In this case it is preferable to carry out the copolymerisation of the hydroxy carboxylic acid or lactone thereof in the presence of a polymerisation chain terminator. The chain terminator may contain a thiol, primary or secondary amino group, but preferably contains a hydroxy group. The POAC compound derived from two different hydroxycarboxylic acids or lactones thereof and which contains a chain terminator attached to the POAC chain via the carbonyl group is a compound of formula 1.

$$T[-(CO-A-O)_n(CO-B-O)_m]H \quad (1)$$

wherein

T is a chain terminating group;

A and B are different $C_{1-17}$-alkylene;

n and m are integers; and n+m is from 2 to 200.

The POAC compound of formula 1 is hereinafter referred to as a TPOAC alcohol.

As noted hereinbefore, the chain terminator preferably contains a hydroxy group when the different hydroxycarboxylic acids or lactones thereof are copolymerised in the presence of T—OH.

T is optionally substituted $C_{1-35}$-hydrocarbyl and may be aromatic, alicyclic, heterocyclic or aliphatic which may be linear or branched, saturated or unsaturated. Preferably, T contains not greater than 20 carbon atoms and more preferably not greater than 10 carbon atoms.

Optional substituents include halogen, $C_{1-6}$-alkoxy, ester (i.e. —OCO—), amide, urethane and ether groups. When T-OH contains one or more ether groups it is preferably derivable from propylene and/or ethylene oxide. Thus, T—OH may be a monohydric alcohol or phenol which is (co) polymerised with propylene and/or ethylene oxide. Examples of monohydric alcohols are $C_{1-20}$-aliphatic alcohols which may be linear or branched, saturated or unsaturated such as phenoxyethanol, octanol, $C_{11-16}$-fatty alcohols, nonanol, ethanol, butanol and methanol. Examples of phenols (co) polymerised with propylene and/or ethylene oxide are nonylphenol and β-naphthol.

When T contains ester, amide or urethane groups, such groups may be made by linking chain fragments of T which contain amino or hydroxy groups using dibasic acids or anhydrides or di-isocyanates. Examples of compounds capable of such cross-linking chain fragments of T are teraphthalic acid, adipic acid, maleic acid, phthalic anhydride, maleic anhydride and toluene di-isocyanate.

In a preferred class of dispersants, T is $C_{1-35}$-alkyl, more preferably $C_{1-20}$-alkyl and especially $C_{1-10}$-alkyl.

As noted hereinbefore, the dispersants are similar to those disclosed in U.S. Pat. No. 4,647,647, U.S. Pat. No. 4,795,796, U.S. Pat. No. 5,399,294, U.S. Pat. No. 5,425,900 and WO 97/26984 but exhibit superior properties. The contents of these disclosures are incorporated herein by reference.

The polyisocyanates used to make the dispersants include those obtainable by the addition reaction of di-isocyanates and polyols such as

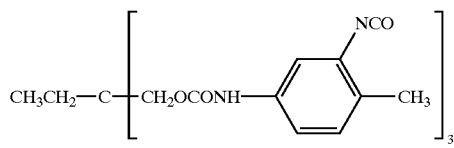

or those obtainable from di-isocyanates by the biuret reaction, such as

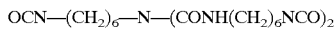

or polyisocyanates obtainable by the cyclisation of di-isocyanates such as

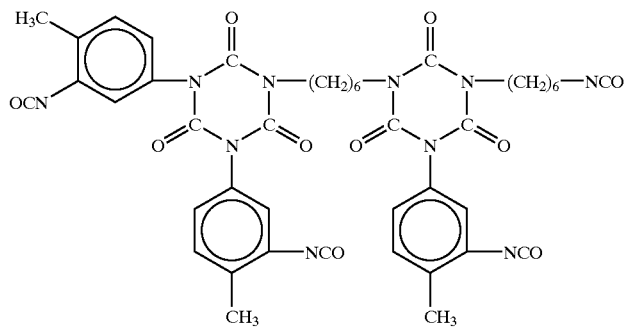

Trade product: Desmodur HL
(registered Trade Mark)

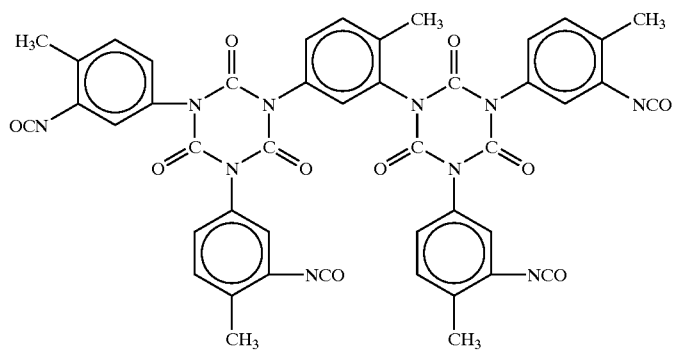

Trade product: Desmodur IL
(registered Trade Mark)

-continued
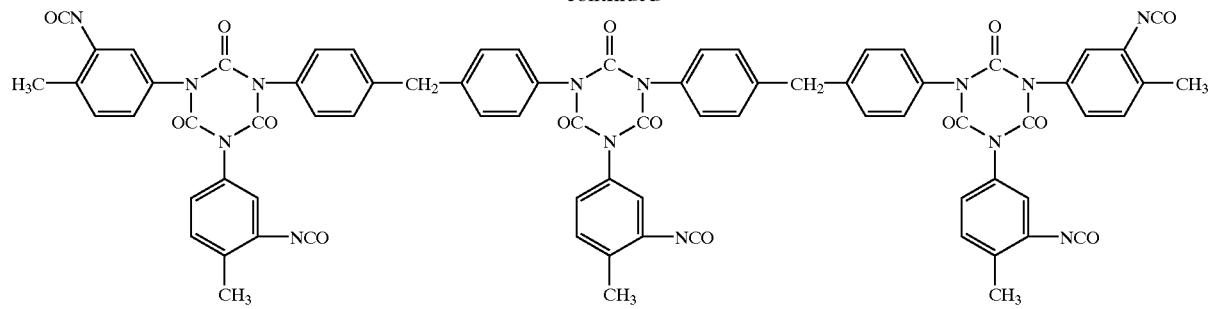
Trade product: Polurene KC (registered Trade Mark)
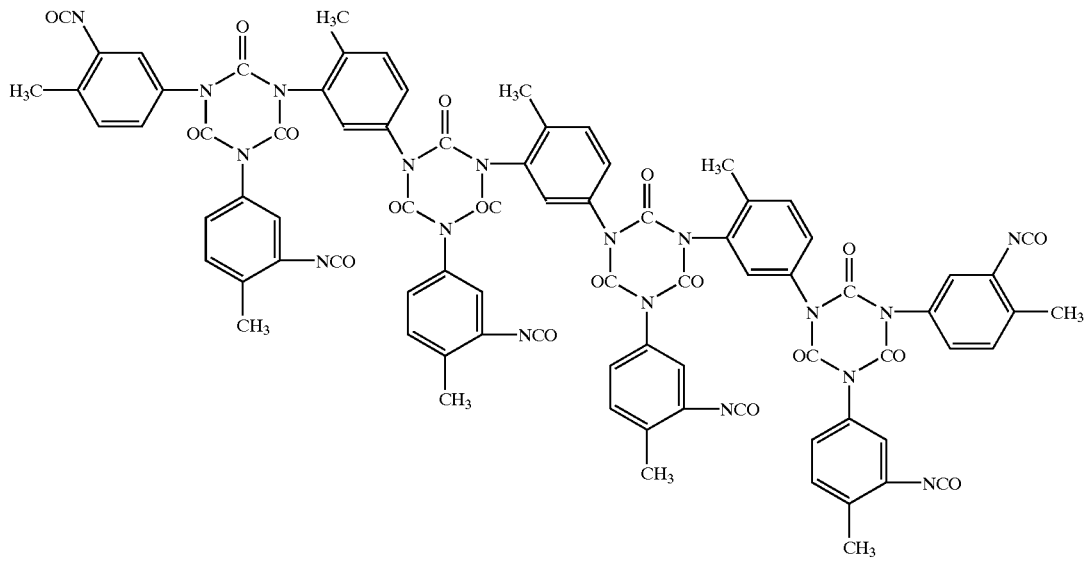
Trade product: Polurene HR (registered Trade Mark)
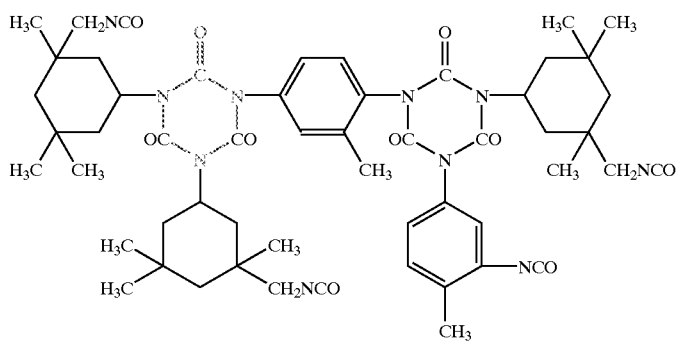
Tolylene diisocyanate-isophorone diisocyanate-isocyanurate
Company: SAPICI)
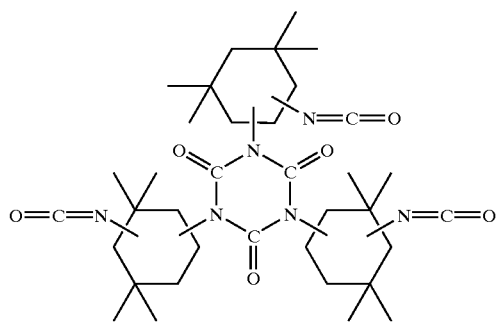
Trimeric isophoronediisocyanate (isocyanurate-T1890 of Chemische Werke Huls)

Further examples of polyisocyanates available as commercial products include Desmodur VL (polyisocyanate based on diphenylmethane diisocyanate (MDI) from Bayer), Desmodur A 4370 (polyisocyanate based on isophorone diisocyanate (IPDI) from Bayer), Polurene KD (polyisocyanate based on toluene diisocyanate (TDI) from SAPICI), Uronal RA.50 (polyisocyanate based on TDI from Galstaff), Polurene A (polyisocyanate based on TDI-trimethylol propane (TMP) from SAPICI), Polurene MC (polyisocyanate based on TMP-IPDI from SAPICI), Polurene MD.70 (polyisocyanate based on TMP-TDI-MDI from SAPICI.

Many of the polyisocyanates are commercially available as mixtures. The term "average functionality" means the statistical average number of free isocyanate groups in the polyisocyanate and is the ratio of average molecular weight of the polyisocyanate and the isocyanate equivalent weight taking into account the number of isocyanate groups.

The amount of POAC compound or TPOAC alcohol which undergoes the addition reaction with the polyisocyanate may vary over wide limits depending on the end use of the dispersant and particularly whether the dispersant is to be used to disperse a particulate solid in a polar medium or in a non-polar medium.

According to a first aspect of the invention, each polyisocyanate molecule should on average preferably contain one or more POAC chains provided that there remain two isocyanate groups which are not reacted with the POAC compound or TPOAC alcohol. Of these "free" remaining isocyanate groups, one free isocyanate group is reacted with a cross-linker to link two polyisocyanate molecules carrying one or more POAC chains and the remaining isocyanate is reacted with a "modifier" to adapt the dispersant for use in a polar or non-polar medium. Thus, where the polyisocyanate has an average functionality of about 3, preferably at least 0.8, and more preferably about 1 of the isocyanate groups is reacted with a POAC compound or TPOAC alcohol. When the polyisocyanate has an average functionality of between 3 and 6, it may be reacted with more than one POAC compound or TPOAC alcohol for each molecule of the polyisocyanate. The remaining "free" isocyanate groups may be reacted with cross-linkers or modifiers although it is preferred that only one of the remaining free isocyanate groups is reacted with a modifier.

The reaction of the polyisocyanate with the POAC compound or TPOAC alcohol, cross-linker and modifier may be carried out simultaneously but is preferably carried out sequentially. The reaction between the polyisocyanate and POAC compound or TPOAC alcohol thus results in the reaction of from 15% to 50% of the available isocyanate groups. Preferably not greater than 40%, more preferably not greater than 35% and especially not greater than 30% of the available isocyanate groups are reacted.

When the polyisocyanate containing one or more POAC chains is reacted with a cross-linker, a further 15 to 45% of the initial isocyanate groups react with the cross-linker. Preferably not less than 20%, more preferably not greater than 40%, even more preferably not greater than 35% and especially not greater than 30% of the initial isocyanate groups react with the cross-linker.

When the reactions of the polyisocyanate with the POAC compound or TPOAC alcohol and cross-linker are taken together, not less than 40% and especially not less than 45% of the initial isocyanate groups are reacted. The number of isocyanate groups which react with the POAC compound or TPOAC alcohol and the cross-linker is not greater than 75%, preferably not greater than 65%, more preferably not greater than 55% and especially not greater than 50% of the initial isocyanate groups.

Finally, the remaining free isocyanate groups are reacted with a modifier.

The cross-linker is preferably a compound of general formula 2

$$D\text{—}(E)_p \qquad (2)$$

wherein E is OH, $NH_2$, NHR; p is 2 or 3; D is an aliphatic, cycloaliphatic and/or aromatic group having a molecular weight of not greater than 3,000 and which contains two or more carbon atoms and may contain ether, thioether, ester (i.e. OCO), amide, urethane, sulphone, or $\text{—}Si(CH_3)_2O\text{—}$ groups and R is $C_{1-8}$-alkyl, especially $C_{1-4}$-alkyl.

Preferably E is hydroxyl and it is particularly preferred that $D\text{—}(E)_p$ is a diol.

Examples of cross-linkers of formula 2 are diols, triols, diamines, dialkanolamines, $C_{2-12}$-monoalkanolamines, dihydroxydialkyl sulphides and dihydroxy sulphones such as butanediol, hexanediol, cyclohexanedimethanol, neopentylglycol, ethyleneglycol, alkyl substituted dialkanolamines, glycerol, trimethylolpropane, fatty acid dialkanolamides, thiodiglycol, di-(4-hydroxyphenyl)-sulphone. Preferably, the cross-linker is a polyalkyleneglycol, preferably containing a $C_{2-4}$-alkylene moiety, and more preferably an ethylene moiety. The molecular weight of the polyalkyleneglycol is preferably from 400 to 2000 and especially from 600 to 1500. Alkoxylates with 3 hydroxy groups are obtainable from triols as starting materials. Polyethyleneglycols are the preferred polyalkyleneglycols.

The cross-linker may also contain a POAC chain obtainable by polymerising one or more hydroxycarboxylic acids or lactones thereof using a polyol, especially a diol or triol as starting material. It is also preferred that the POAC chain in the cross-linker is also obtainable by copolymerisation of two or more different hydroxycarboxylic acids or lactones thereof. Preferred polyols have a molecular weight from 800 to 2000. Butanediol and ethyleneglycol are preferred starting materials.

Finally, any "free" remaining isocyanate group is reacted with a modifier. The nature of the modifier depends on the end-use of the dispersant.

In a first aspect of the invention the modifiers are of general formula Z—Q wherein Q is hydroxy, amino, $NHR^1$ or SH wherein $R^1$ is $C_{1-8}$-alkyl and especially $C_{1-4}$-alkyl and Z is an aliphatic group with from 2 to 10 carbon atoms containing at least one tertiary amino group or a heterocyclic group containing at least one basic ring nitrogen atom which carries no hydrogen atom and where the heterocyclic group may be attached to Q by an alkylene group containing up to 10 carbon atoms. Preferably, Z is a mononuclear or dinuclear heterocyclic group having a ring nitrogen atom which is attached to Q, preferably by $C_{2-5}$-alkylene. Preferred heterocyclic groups are optionally sutstituted triazole, pyrimidine, imidazole, pyridine, morpholine, pyrrolidine, piperazine, benzimidazole, benzthiazole and/or triazine. Substituents may be $C_{1-6}$- and especially $C_{1-4}$-alkyl or alkoxy or amino.

As noted hereinbefore Q may be attached to Z via an alkylene group containing up to 10 carbon atoms, preferably $C_{2-8}$-alkylene and especially $C_{2-4}$-alkylene. Q may also be attached to Z via a polyether group containing the same number of carbon atoms as the alkylene group.

Examples of Z—Q are N,N-diethyl-1,4-butanediamine, 1-(2-aminoethyl)-piperazine, 2-(1-pyrrolidyl)-ethylamine, 4-amino-2-methoxypyrimidine, 2-dimethylaminoethanol, 1-(2-hydroxyethyl)-piperazine, 4-(2-hydroxyethyl)-morpholine, 2-mercaptopyridine, 2-mercaptobenzimidazole. It is particularly preferred that Z—Q is N,N-dimethyl-1,3-propanediamine, 4-(2-aminoethyl)-pyridine, 2-amino-6-methoxybenzothiazole, 4-(aminomethyl)-pyridine, N,N-diallylmelamine, 3-amino-1,2,4-triazole, 1-(3-aminopropyl)-imidazole, 4-(2-hydroxyethyl)-pyridine, 1-(2-hydroxyethyl)-imidazole, 3-mercapto-1,2,4-triazole. It is a characteristic of these compounds that they contain at least one Zerewitinoff-active hydrogen atom per molecule, which hydrogen atom preferably reacts with the isocyanate groups and that they additionally contain a basic group which contains nitrogen and which is not capable of reacting with isocyanate groups to form a urea. Such basic groups are also characterised by their pka-values as, for example, in U.S. Pat. No. 3,817,944, U.S. Pat. No. 4,032,698 and U.S. Pat. No. 4,070,388.

According to a second aspect of the invention, the cross-linker is also preferably a compound of formula D—(E)$_p$ as defined in the first aspect and the modifier is of formula K—L or K—NH—K wherein K represents —OH, NH$_2$, —NHR$^2$ or SH where R$^2$ is C$_{1-4}$-alkyl and K is an aliphatic, cycloaliphatic or aromatic residue having at least one acidic functional group and/or at least one OH group, which may be present as an acetal, and/or having at least one —Si(OR$^3$), (R$^4$)$_{3-t}$-group wherein R$^3$ and R$^4$ is C$_{1-10}$-alkyl and t is from 1 to 3. In compound of formula K—NH—K, the groups K may be the same or different.

In the second aspect of the invention, it is preferred that at least 0.8 moles of the compound K—L and/or K—NH K is provided for each isocyanate group which is not reacted with the POAC compound or cross-linker. Any hydroxy groups in the polyurethane dispersant may optionally be reacted with a polycarboxylic acid containing at least two carboxylic acid groups or anhydrides thereof under such conditions which substantially avoid cross-linking reactions.

In the second aspect of the invention, the reaction between the polyisocyanate, POAC compound or TPOAC alcohol, cross-linker and modifier can be carried out in similar manner to that described in the first aspect of the invention. Preferably from 10 to 70% of the isocyanate groups in the polyisocyanate are reacted with the POAC compound or TPOAC alcohol. Preferably, not less than 15% and not less than 20% of the isocyanate groups are reacted with the POAC compound or TPOAC alcohol. It is also preferred that not greater than 45%, more preferably not greater than 40% and especially not greater than 30% of the isocyanate groups of the polyisocyanate are reacted with the POAC compound or TPOAC alcohol.

In the second aspect of the invention, it is preferred that from 1 to 50% of the originally present isocyanate groups are further reacted with the cross-linker. It is also preferred that not less than 5% and especially not less than 15% of the originally present isocyanate groups are reacted with the cross-linker and preferably not greater than 45%, more preferably not greater than 40% and especially not greater than 30% of the original isocyanate groups are reacted with the cross-linker.

In total, in the second aspect of the invention, between 20 and 85% of the isocyanate groups present in the polyisocyanate are reacted with the POAC compound or TPOAC alcohol and cross-linker. It is particularly preferred that not less than 30%, not greater than 65%, more preferably not greater than 60% and especially not greater than 50% of the originally present isocyanate groups are reacted with the POAC compound or TPOAC alcohol and cross-linker.

In general, any compound can be used as the modifier K—L or K—NH—K provided it contains a group capable of reacting with an isocyanate group and at least one acidic group. Examples are mercaptoacetic, mercaptopropionic, mercaptosuccinic, mercaptobenzoic, ricinoleic, 12-hydroxystearic, hydroxyacetic, hydroxysuccinic, hydroxybutyric, aminobutyric, 4-aminophenylacetic, 4-aminobenzoic, aminoacetic, hydroxyethanesulphonic, hydroxypropanesulphonic, mercaptoethanesulphonic, aminomethanesulphonic, 3-aminopropanesulphonic, sulphanilic, N-(2-hydroxyethyl)ethylenediaminetriacetic acid, N-(2-hydroxyethyl)imino diacetic, 4-aminobenzenephosphonic and 3-aminopropane-1-phosphonic acids.

Examples of modifiers where K contains one or more OH groups are organic polyols such as ethyleneglycol, propyleneglycol, 1,12-dodecanediol, 1,4-bis(hydroxymethyl)cyclohexane, phenylethyleneglycol, diethyleneglycol, triethyleneglycol, dipropyleneglycol, 2-butane-1,4-diol, 3-hexene-2,5-diol, glycerin, 1,2,4-butanetriol, triethanolamine, 2,2-bis(hydroxymethyl)-1,3-propanediol, 1,2,7,8-octanetetrol, dipentaerythritol, N,N,N$^1$N$^1$-tetrakis(2-hydroxypropyl)ethylenediamine. Examples of monohydroxy or polyhydroxy compounds which contains an amino group are preferred such as ethanolamine, 3-aminopropanol, isopropanolamine, 2-methylaminoethanol, 2,2$^1$-aminoethoxyethanol, 1-aminopropane-2,3-diol, 2-amino-2-ethylpropane-1,3-diol, 2-butylaminoethanol, tris(hydroxymethyl)aminoethane, 2-cyclohexylaminoethanol, 3-amino-2,2-dimethyl-1-propanol, 4-amino-1-butanol and 2-amino-1-phenylpropane-1,3-diol.

Examples of modifiers containing at least one alkoxysilyl group are 3-aminopropyltrimethoxysilane, 3-aminopropyltriethoxysilane, 3-mercaptopropyltrimethoxysilane, 4-aminophenyltriethoxysilane, 4-aminobutyltriethoxysilane, 4-aminobutyldimethylmethoxysilane, N-(2-aminoethyl)-3-aminopropyltrimethoxysilane, bis-[3-(triethoxysilyl)propyl]amine and trimethoxysilylpropyldiethylenetriamine.

Examples of the modifier K—NH—K are ethylenediamine-N,N$^1$-diacetic acid, ethylenediamine-N,N$^1$-bis[2-(2-hydroxyphenyl)acetic acid, ethanolamineacetic acid, diethanolamine, diisopropanolamine and bis[3-(triethoxysilyl)-propyl]amine.

According to a third aspect of the invention, the polyisocyanate is reacted with (B) a mixture from (B$_1$) a POAC compound or TPOAC alcohol, and (B$_2$) a monohydroxy monocarboxylic acid or monoamino monocarboxylic acid, and (C) a compound containing at least one basic ring nitrogen and an isocyanate-reactive group wherein, of the isocyanate groups present in the polyisocyanate, preferably between 30 and 70% are reacted with B and preferably from 30 to 70% are reacted with C. These dispersants are particularly effective in dispersing particulate solids in resins such as alkyd resins and oil-free polyester resins.

The monohydroxy-monocarboxylic acid represented by B$_2$ is obtainable by the esterification of hydroxycarboxylic acids or by the reaction of a diol with a dicarboxylic acid or its anhydride. The mono-amino monocarboxylic acid is obtainable in analogous manner. Preferably, the molecular weight of the compound B$_2$ is from 750 to 4000.

Preferably, the amount of POAC compound or TPOAC alcohol is greater than the amount of monohydroxycarboxylic acid or monoaminomonocarboxylic acid. It is also preferred that the number of hydroxy groups originating from the POAC compound or TPOAC alcohol on the one hand and the mono-hydroxy- or mono-amino-monocarboxylic acid on the other hand is from 1:1 to 10:1 and especially from 2:1 to 5:1.

In the third aspect of the invention, examples of compounds containing a basic nitrogen atom are N, N-diethyl- 1,4-butanediamine, 1-(2-aminoethyl)-piperazine, (1-pyrrolidyl)ethylamine, 4-amino-2-methoxy-pyrimidine, 2-dimethylaminoethanol, 1-(2-hydroxyethyl)-piperazine, 4-(2-hydroxyethyl)-morpholine, 2-mercaptopyrimidine, 2-mercaptobenzimidazole and especially N,N-dimethyl-1,3-propanediamine, 4-(2-aminoethyl)-pyrimidine, 2-amino-6-methoxybenzothiazole, 4-(aminoethyl)-pyridine, N,N-diallylmelamine, 3-amino-1,2,4-triazole, 1-(3-aminopropyl) imidazole, 4-(2-hydroxyethyl)-pyridine, 1-(2-hydroxyethyl)-imidazole and 3-mercapto-1,2,4-triazole.

In the third aspect of the invention, the polyisocyanate may also be reacted with a small amount of a diol such that preferably less than 5% and especially less than 2.5% of the initially present isocyanate groups are reacted with the diol. It is especially preferred that no such diols are used.

According to a fourth aspect of the invention, the polyisocyanate is reacted with (B) one or more POAC compounds or TPOAC alcohols, (C) at least one dicarboxylic acid compound and (D) a compound containing at least one basic ring nitrogen atom and an isocyanate-reactive group in which preferably from 30 to 70% of the isocyanate groups in the polyisocyanate are reacted with B and C together and preferably from 30 to 70% of the isocyanate groups in the polyisocyanate are reacted with D. These dispersants are also especially useful for dispersing particulate solids in resins such as alkyd resins and oil-free polyester resins.

The dicarboxylic acid compound is obtainable by reacting a diol with a dicarboxylic acid or anhydride thereof. The diol is preferably a poly($C_{2-4}$-alkyleneglycol) and especially a polyethyleneglycol. It is also preferred that the molecular weight of the diol is greater than the molecular weight of the dicarboxylic acid.

Preferably, the dicarboxylic acid contains at least eight carbon atoms between the carboxylic acid groups which may be substituted by amide, ether, ester (i.e. OCO), thioether, sulphone and/or urethane groups. Preferably, the molecular weight of the dicarboxylic acid compound is not less than 500 and especially not less than 750. It is also preferred that the molecular weight of the dicarboxylic acid compound is not greater than 4,000. Examples of the dicarboxylic compounds are the reaction products of polyethyleneglycol (MW 1000) with maleic and/or phthalic anhydride.

Examples, including preferred examples, of the compounds containing at least one basic ring nitrogen atom are as described for the third aspect of the invention.

According to a fifth aspect of the invention there is provided a dispersant which is the addition product of a polyisocyanate with one or more POAC compounds or TPOAC alcohols and a modifier which is a heterocyclic compound which contains at least one nitrogen atom which is obtainable by reacting an acrylate or epoxide with the heterocyclic ring system.

Preferably, the heterocyclic compound is of formula P-Q-W wherein P represents a heterocyclic ring structure containing at least one nitrogen atom, Q is a chain containing at least three atoms and W is a group $OR^5$ or $N(R^5)(R^6)$ wherein $R^5$ is H or a group $R^7$-$L^1$ wherein $R^7$ represents a chain with at least two atoms and $L^1$ is hydroxy or amino and $R^6$ represents $R^7$-$L^1$.

Preferably, Q has a carbonyl group at the γ-position with respect to the group P, e.g. the compound is obtainable from an acrylate and the heterocyclic ring structure. The free acid of the heterocyclic compound (W is OH) or its amide or ester can be used. Examples are the reaction products of hydroxyethyl and hydroxypropyl esters of (meth) acrylic acid with the heterocyclic ring structure wherein the following are attached to the nitrogen of the heterocyclic ring structure:- propionic acid-2-hydroxyethylester, propionic acid-2-hydroxypropylester, 2-methylpropionic acid-2-hydroxyethylester, and 2-methyl-propionic acid 2-hydroxypropylylester, and ethoxylated and/or propoxylated derivatives thereof. Acrylic acid esters are preferred.

Alternatively, the compound P-Q-W is obtainable by reacting an epoxide such as glycidol with the heterocyclic ring structure. When glycidol is used the heterocyclic ring structure contains a 1,2-dihydroxypropyl substituent attached to nitrogen.

Examples of the heterocyclic ring structures which are used to prepare the heterocyclic compound are piperazine, imidazole, benzimidazole, imidazoline, pyrrolidine, pyrazole, 1,2,4-triazole, benzotriazole, indazole, 1-H-tetrazole, including substituted derivatives thereof. Preferred heterocycles are pyrrolidine, 1,2,4-triazole, pyrazole, imidazole and derivatives thereof.

Specific examples of the heterocyclic compounds are 3-benzimidazol-1-yl-propionic acid -2-hydroxyethyl ester, 1,2-dihydroxy-3-benzimidazol-1-yl propane, 3-pyrazol-1-yl propionic acid -2-hydroxyethyl ester, 3-(2-phenyl-2-imidazol-1-yl) propionic acid -2-hydroxyethyl ester, 3-(1H,2,4-triazol-1-yl) propionic acid -2-hydroxyethyl ester, 3-(1,2,4H-triazol-1-yl) propionic acid -2-hydroxyethyl ester, 3-(1H-benzotriazol-1-yl) propionic acid -2-hydroxyethyl ester, 3-(2H-benzotriazol-2-yl) propionic acid -2-hydroxyethyl ester, 3-imidazol-1-yl propionic acid -2-hydroxypropyl ester, and 3-(2-methylimidazol-1-yl) propionic acid -2-hydroxyethyl ester.

In a preferred version according to the fifth aspect of the invention, the polyisocyanate is also reacted with a cross-linker which may be a diol, diamine, dicarboxylic acid and/or monohydroxy-monocarboxylic acid. The cross-linker preferably contains a chain of at least 8 carbon atoms between the functional OH, $NH_2$ and COOH groups. This chain may also contain amide, ether, thioether, ester (i.e. OCO) and/or urethane groups. Preferably, the cross-linker in the fifth aspect of the invention has a molecular weight of greater than 200 and especially from 750 to 4000.

Preferably, from 40 to 80% of the isocyanate groups in the polyisocyanate are reacted with the POAC compound or TPOAC alcohol and the cross-linker. It is also preferred that from 20 to 60% of the isocyanate groups are reacted with the modifier P-Q-W.

As with previous aspects of the invention, any isocyanate groups remaining in the urethane dispersant may be removed by reaction with amines and alcohols such as n-butanol.

According to a sixth aspect of the invention there is provided a polyurethane dispersant obtainable by reacting together (a) a polyisocyanate containing two or more isocyanate groups (b) an organic compound containing two or more groups which react with isocyanate groups and (c) a compound containing a POAC chain or a TPOAC alcohol.

The polyisocyanate (a) may be aliphatic or alicyclic but is preferably aromatic. Examples are hexamethylene di-isocyanate, isophoronedi-isocyanate, 4,4$^1$- diphenylmethanedi-isocyanate, 2,4-tolylenedi-isocyanate and 2,6-tolylenedi-isocyanate, including mixtures thereof.

Compound (b) preferably contains at least two hydroxy and/or primary or secondary amino groups. Examples are trimethylolpropane, diethanolamine, triethanolamine but especially compounds containing two groups which react with isocyanate, for example, aliphatic diols such as ethyleneglycol, propyleneglycol, butane-1,3-diol, butane-1,4-diol, 1,5-pentanediol, 1,6-hexanediol and 1,10-decanediol. Other preferred compounds are aliphatic diamines such as ethylenediamine, 1,3-propylenediamine, hexamethylenediamine, 1,12-diaminododecane and compounds of formula V $NH(CH_2)_3NH_2$ where V is a long aliphatic chain such as tallow. Other examples of compounds (b) are amino alcohols such as ethanolamine, β-hexadecylaminoethanol, diols containing ether groups such as diethyleneglycol, triethyleneglycol, polyethyleneglycol, dipropyleneglycol and ethoxylated aliphatic amines.

Compounds (a), (b) and (c) may be reacted together simultaneously or sequentially by first reacting (a) with (b) or (a) with (c). Preferably, (a) is first reacted with (c) and then with (b). If the product of such reaction still contains unreacted isocyanate groups these may be reacted with simple alcohols or amines such as methanol or ethylamine.

Preferably, from 1 to 10 and especially from 1.5 to 3 molecules of compound (a) is reacted with each molecule of compound (c). It is also preferred that the amount of compound (b) is equivalent to the number of isocyanate groups still remaining. The reactions may be carried out in solvents, optionally in the presence of catalysts such as diazabicyclooctane.

The POAC chain or TPOAC alcohol is readily prepared by heating together the hydroxycarboxylic acids or lactones thereof, preferably in the presence of a polymerisation terminator in an inert atmosphere and preferably in the presence of an esterification catalyst. The reaction may be carried out in the presence of an inert solvent which does not react with the starting materials or the POAC compound or TPOAC alcohol. Preferably, the reaction is carried out in the absence of a solvent. Typically the temperature of the reaction is between 120 and 180° C.

Examples of esterification catalysts are tetra-alkyltitanate such as tetrabutyltitanate, zinc salts of an organic acid such as zinc acetate, tin salts of an organic acid such as tin octanoate, zirconium salts of an aliphatic alcohol such as zirconium isopropoxide, toluenesulphonic acid or a strong organic acid such as trihaloacetic acid, e.g. trifluoroacetic acid.

All the reactions involving the polyisocyanate may be carried out by any method known to the art. Thus, they may be carried out in the presence of an inert solvent such as aliphatic or aromatic hydrocarbons, ethers and amides. Examples of specific solvents are xylene, dioxane and dimethylformamide. The reaction involving the isocyanate groups may also be carried out in the presence of a catalyst such as dibutyltin dilaurate, iron acetyl acetonate or triethylenediamine.

As noted hereinbefore, the dispersants are particularly useful for dispersing a particulate solid in an organic medium.

According to a further aspect of the invention there is provided a composition comprising a particulate solid and The Dispersant.

According to a still further aspect of the invention there is provided a dispersion comprising The Dispersant, a particulate solid and an organic medium.

The solid present in the dispersion may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and agrochemicals such as the fungicides flutriafen, carbendazim, chlorothalonil and mancozeb.

The organic medium present in the dispersions of the invention is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, dodecane and high boiling aliphatic distillates such as white spirits and halogenated aliphatic and aromatic hydrocarbons, such as trichloro-ethylene, perchloroethylene and chlorobenzene.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, the dispersants of the invention are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, The Dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The dispersants of the present invention exhibit advantage over known dispersants derived from ε-caprolactone. In particular, they exhibit superior solubility in organic media such as solvents and do not separate or crystallise when stored at 4° C. for lengthy periods. When stored at low temperatures, separation can occur at −24° C. but the dispersants readily re-dissolve on warming to 4–10° C. When incorporated into paints and painting inks, the dispersants of the present invention give rise to higher gloss readings and lower haze values in the resultant paints and inks.

The invention is further illustrated by the following examples wherein all references to amounts are in parts by weight unless indicated to the contrary.

EXAMPLES

Preparation of Alkyl ε-Caprolactone Intermediates
Lactone 1 4- and 6-Methyl ε-Caprolactone 3-methylcyclohexanone (10 parts, 0.089M ex. Aldrich) was dissolved in dichloromethane (400 ml) and sodium bicarbonate (37 parts) added, portionwise, with vigorous stirring at 18–20° C. under a nitrogen atmosphere. A suspension of 3-chloroperoxybenzoic acid (24.17 parts, 0.098M ex. Fluka) in dichloromethane (100 ml) was then added over 10 minutes with external cooling to maintain a temperature below 20° C. and the reaction continued at 18–20° C. by stirring for a further 4 hours. The reaction mix was then shaken with a 10% aqueous solution of sodium sulphite (2×250 ml) followed by water (2×250 ml) and then dried over anhydrous magnesium sulphate. After evaporating the solvent a mixture of 4- and 6-methyl ε-caprolactone was obtained as a thin yellow oil (8 parts).

Lactone 2 3- and 7-Methyl ε-Caprolactone

This was prepared in the same manner as that described for Lactone 1 except using the same weight of 2-methylcyclohexanone (ex. Aldrich) in place of 3-methylcyclohexanone. The product was obtained as a clear oil (8 parts) and is mainly 7-methyl ε-caprolactone (95%).

Lactone 3 5-Methyl ε-Caprolactone

This was prepared in similar manner to Lactone 1 except using 4-methyl cyclohexanone (50 parts; 0.445 m ex. Aldrich) in place of the 3-methylcyclohexanone with appropriate increase in the dichloromethane (1500 ml), sodium bicarbonate (8.1 parts, 1.0M) and 3-chloroperoxybenzoic acid (123 parts; 0.5M). The reaction temperature was maintained below 10° C. throughout. The 5-methyl ε-caprolactone was obtained as a clear yellow oil (49 parts).

Lactone 4 5-Tertbutyl ε-Caprolactone

This was prepared in the same manner as Lactone 1 except using 4-tert butylcyclohexanone (10 parts, 0.065 m ex. Aldrich), 3-chloroperoxybenzoic acid (17.5 parts, 0.0713M), sodium bicarbonate (11.5 parts, 0.143M) and dichloromethane (750 ml) in place of the 3-methyl cyclohexanone and amounts described for Lactone 1. The product was obtained as an oil (10.2 parts). Lactone 5 4,6,6- and 4,4,6-trimethyl E-carrolactone 3,3,5-Trimethylcyclohexanone (10 parts, 0.071M ex. Fluka) was dissolved in dichloromethane (200 ml). 3-chloroperoxybenzoic acid (30.6 parts, 0.142M) was added, portionwise, with stirring and the reaction mix cooled externally below 5° C. Trifluoroacetic acid (8 parts, 0.071M ex. Fluka) was added dropwise over 30 minutes with stirring at 0–5° C. and the reactants stirred for a further 20 hours allowing the temperature to rise to 18–20° C.

The reaction mass was then poured into a 10% w/w aqueous solution of sodium sulphite (50 ml) and allowed to stand. The solvent layer was separated and shaken with 10% aqueous sodium sulphite (2×50 ml), 10% w/w aqueous potassium carbonate (3×50 ml) and water (2×50 ml). Finally, the solvent phase was dried over anhydrous sodium sulphate and the solvent evaporated. The product was obtained as a clear colourless oil (11 parts).

Preparation of Intermediates

In the legends describing the preparation of intermediates used to make the polyurethane dispersants, the figures in parentheses refer to the molar ratio of the starting materials.

Preparation of TPOAC alcohol

TPOAC 1 BuO ε-Cap δ-Val (1:9:3.5)

n-Butanol (2.22 parts, 0.03M ex Fisher), ε-caprolactone (30.82 parts, 0.27M ex Aldrich) and δ-valerolactone (10.51 parts, 0.105M ex Fluka) were stirred under nitrogen at 130° C. Zirconium butylate (0.3 parts 80% in BuOH ex Fluorochem) was added, the temperature raised to 175° C. and maintained at this temperature for 6 hours. The product was obtained as a clear viscous liquid (39 parts).

TPOAC 2 BuO ε-Cap (1:12.6)

This was made in identical manner to TPOAC 1 except using n-butanol (4.9 parts 0.066M), ε-caprolactone (95.1 parts 0.83M) and zirconium butylate (0.2 parts). The product was obtained as a clear viscous liquid forming a white wax on cooling (94 parts).

TPOAC 3 OcO ε-Cap δ-Val (1:10:5)

This was prepared in a similar manner to TPOAC 1 using n-octanol (4.56 parts 0.035M ex Aldrich), ε-caprolactone (40 parts, 0.35M), δ-valerolactone (17.54 parts 0.175M) and zirconium butylate (0.3 parts). On cooling the product was obtained as a clear, light brown, viscous liquid (51 parts).

TPOAC 4 OcO ε-Cap (1:15)

This was prepared in identical manner to TPOAC 3 except using octanol (7.2 parts 0.0553M), ε-caprolactone (92.8 parts, 0.82M) and zirconium butylate (0.2 parts). The product was obtained as a beige wax (95 parts).

TPOAC 5 Dod ε-Cap δ-Val (1:3:2)

This was prepared in identical manner to TPOAC 1 except using dodecanol (20 parts, 0.107M ex Aldrich), ε-caprolactone (36.74 parts 0.322M) and δ-valerolactone (21.5 parts, 0.215M). The product was obtained as a clear liquid (71 parts).

TPOAC 6 Dod εCap (1:5)

This was prepared in identical manner to TPOAC 5 except using dodecanol (20.8 parts 0.112M) and ε-caprolactone (63.84 parts 0.56M) as the sole lactone. The product was obtained as a clear viscous liquid which gave a white wax on cooling (79 parts).

TPOAC 7 Bu ε-Cap δ-Val (1:8:4.6)

This was prepared in identical manner to TPOAC 1 except using n-butanol (4 parts, 0.054 M), ε-caprolactone (49.28 parts, 0.43 M) and δ-valerolactone (24.85 parts, 0.248 M). The product was obtained as a clear viscous liquid (70 parts).

TPOAC 8 EH ε-Cap δ-Val (1:5.6:2)

2-Ethylhexan-1-ol (EH, 10.4 parts, 0.08M ex Aldrich), ε-caprolactone (51.04 parts, 0.45 M) and δ-valerlactone (20.46 parts, 0.2 M) were stirred at 130° C. under nitrogen. Zirconium butylate (0.3 parts) was added and the reactants were stirred at 175–80° C. for 6 hours. The product was obtained as a beige wax (77 parts).

TPOAC 9 EH ε-Cap (1:7.6)

2-Ethylhexan-1-ol (EH, 10.4 parts, 0.081M ex Aldrich) and ε-caprolactone (69.6 parts, 0.61 M ex Aldrich) were stirred under nitrogen at 140° C. Zirconium butylate (0.3 part) was added and the reactants stirred at 175–80° C. for 6 hours. The product was obtained as a clear viscous liquid giving a white wax on cooling (76 parts).

The following TPOAC alcohols were prepared in similar manner to TPOAC 1. The figures in parentheses indicate the molar ratio of the components. ε-cap is ε-caprolactone and δ-val is δ-valerolactone.

TPOAC 10 MeO PEG 550/ε-Cap 7-Me ε-Cap (1:6:2.8)

MeO PEG 550 is polyethylene glycol monomethylether, MW 550 ex Fluka and 7-Me ε-cap is Lactone 2.

TPOAC 11 MeO PEG 550/ε-Cap (1:8.8)

TPOAC 12 MeO PEG 550/ε-Cap/δ-Val (1:6:2.8)

TPOAC 13 PFD/EH/ε-Cap/7-Me ε-Cap (1:9.6:150:21)

PFD is perfluorodecan-1-ol ex Fluka, EH is 2-ethylhexanol ex Aldrich and 7-Me ε-cap is Lactone 2

TPOAC 14 PFD/EH/ε-Cap (1:9.6:171)

TPOAC 15 DD/ε-Cap/δ-Val (1:3:1)

DD is dodecane-1,12-diol ex Aldrich

TPOAC 16 DD/ε-Cap (1:4)

TPOAC 17 PE/ε-Cap/4/6-Me ε-Cap (1/6.3/2)

PE is 2-phenylethanol ex Fluka and 4/6-Me ε-cap is Lactone 1

TPOAC 18 PE/ε-Cap (1/8.3)

TPOAC 19 PE/ε-Cap/δ-Val (1/6.3/2)

TPOAC 20 PE/ε-Cap/7-Me ε-Cap (1/7.3/1.2)

TPOAC 21 No/ε-Cap/δ-Val (1/30/12.5)
  No is nonan-1-ol ex Aldrich
TPOAC 22 No/ε-Cap (1/42.5)

Preparation of Diol Cross-linkers

Diol 1 Bu-diol ε-Cap δ-Val (1:5.7:3)

Butane-1,4-diol (4.5 parts 0.046M ex Aldrich), ε-caprolactone (29.8 parts 0.261M) and δ-valerolactone (13.75 parts 0.137M) were stirred at 130° C. under nitrogen.

Zirconium butylate (0.21 parts) was added and the reactants stirred at 170° C. for 6 hours under nitrogen. On cooling, the product was obtained as a clear viscous liquid (41 parts).

Diol 2 Bu-diol ε-Cap (1:8.7)

This was prepared in identical manner to Diol 1 except using 45.5 parts ε-caprolactone as the sole lactone. The product was obtained as a clear viscous liquid which formed a white wax on cooling (46 parts).

Diol 3 DD ε-Cap δ-Val (1:6:2.8)

This was prepared in identical manner to Diol 1 except using dodecane-1,12-diol (DD, 11.76 parts, 0.058 M ex Aldrich), ε-caprolactone (39.8 parts, 0.35 M) and ε-valerolactone (16.29 parts, 0.163 M). The product was obtained as a waxy solid (61 parts).

Diol 4 DD ε-Cap (1:8.8)

This was prepared in identical manner to Diol 3 except using 58.24 parts ε-caprolactone as the sole lactone. The product was obtained as a white wax (65 parts).

Preparation of Diacid Cross-linkers

Diacid 1 PEG 1000 MA (1:2)

Polyethyleneglycol (PEG 1000, 125 parts 0.125M ex Aldrich), maleic anhydride (24.5 parts 0.25M ex Aldrich) and methoxypropylacetate (16.61 parts) were stirred at 150° C. under nitrogen for 8 hours. The product was obtained as a yellow-brown viscous liquid with an Acid Value of 88.79 mg KOH/gm which gave a light brown wax on cooling (150 parts).

Preparation of Monoacid Cross-linkers

Monoacid 1 PEG 1000/PA (1:1)

Polyethyleneglycol (75 parts PEG 1000 0.075M ex Aldrich) and phthalic anhydride (11.1 parts 0.075M ex Aldrich) were stirred under nitrogen for 8 hours at 150° C. when the Acid Value was 49.88 mg KOH/gm. The product was obtained as a clear viscous liquid giving a white wax on cooling (81 parts).

Monoacid 2 PEG 1000TCPA (1:1)

Polyethyleneglycol MW 1000 (PEG 1000, 60 parts, 0.06 M ex Fluka) and tetrachlorophthalic anhydride (TCPA, 17.1 parts, 0.06 M ex Aldrich) were stirred at 150° C. for 4.5 hours under nitrogen. The product was obtained as a yellow liquid which gave a pale yellow waxy solid on cooling with an acid value of 46.45 mg KOH/gm.

Preparation of Monoamine Modifiers

Monoamine Modifier 1 PI/HEA (1:1)

2-Phenyl-2-imidazoline (14.62 parts, 0.1M ex Aldrich) and 2-hydroxyethyl acrylate (11.61 parts, 0.1 M ex Aldrich) were stirred at 20° C. under a nitrogen blanket. The reactants were heated to 30° C. with stirring when the temperature rose exothermically to 67° C. The reactants were then stirred at 70° C. for 2.5 hours. On cooling, the product was obtained as a clear yellow oil (24 parts).

Preparation of Polyurethane Dispersants

Example 1

BuO ε-Cap δ-Val (1:9:3.5)/Desmodur N/PEG 1000/3-Aminopropanol

TPOAC 1 (18.29 parts, 0.0126M), Desmodur N (8.8 parts 0.0138M, 75% solution in ethyleneglycolacetate/xylene ex Bayer), xylene (23.3 parts) and dibutyl tin dilaurate (0.01 parts) were stirred at 80° C. under nitrogen for 1.5 hours. Polyethyleneglycol (PEG 1000, 3 parts, 0.003M ex Aldrich) in xylene (41.3 parts) was added and the reactants stirred under nitrogen at 80° C. for a further 1.5 hours. Finally, 3-aminopropanol (1.5 parts, 0.02M ex Aldrich) in xylene (3.2 parts) was added and the reaction continued at 80° C. for a further 2 hours. On cooling the product was obtained as a slightly hazy viscous liquid (95 parts) having a solids content of 32% in xylene. This is Dispersant 1.

Comparative Example A

BuO ε-Cap (1:12.6)/Desmodur N/PEG 1000/3-Aminopropanol

This was prepared in identical manner to Dispersant 1 in Example 1 except using TPOAC 2 (18.9 parts, 0.125M) in place of the TPOAC 1. The product was obtained as a clear viscous liquid (95 parts) having a solids content of 32% in xylene. This is Dispersant A.

Example 2

OcO ε-Cap δ-Val (1:10:5)/Desmodur IL/Bu-diol ε-Cap δ-Val (1:5.7:3)/4-(2-aminoethyl)pyridine TPOAC 3 (10.53 parts), Desmodur IL (16.1 parts as 51% solution in ethylacetate ex Bayer) were stirred at 20° C. in ethylglycolacetate/xylene (1:1) (20 parts) and under a nitrogen blanket. Dibutyl tin dilaurate (0.01 parts) was added and the reactants stirred at 20° C. for 2 hours. Diol 1 (3.67 parts) was then added dissolved in xylene (17.1 parts) and the reaction continued at 20° C. for 2 hours. Xylene (10 parts) and 4-(2-aminoethyl)pyridine (2 parts ex TCI) was added dissolved in di-isobutylketone (10 parts). Finally, the reactants were heated to 50° C. for 1 hour. The product, Dispersant 2, was obtained as a pale yellow liquid (100 parts) and having a solids content of 23% by weight.

Comparative Example B

OcO ε-Cap (1:15)/Desmodur IL/Bu-diol ε-Cap (1:8.7)/ 4-(2-ethylamino)pyridine

This was prepared in identical manner to Dispersant 2 of Example 2 except using TPOAC 4 (11 parts) and Diol 2 (3.8 parts) in place of TPOAC 3 and Diol 1. The product, Dispersant B, was obtained as a pale yellow liquid (102 parts) and having a solids content of 23% by weight.

Example 3

Dod ε-Cap δ-Val (1:3:2)/Desmodur IL/PEG 1000 PA (1:1)/ 2-amino4-methylpyridine

TPOAC 5 (19.77 parts), Desmodur IL (31.5 parts as a 51% solution in ethylacetate ex Bayer), Monoacid 1 (6.02 parts) and tin octanoate (0.02 parts ex Elementis) were stirred at 70° C. for 2 hours in butyl acetate (20 parts) and methoxypropylacetate (20 parts) under a nitrogen blanket. 2-Amino-4-methylpyridine (2.71 parts ex Fluka) dissolved in N-methylpyrrolidine (13.51 parts) was added and the reactants stirred at 70° C. under nitrogen for 1 hour. Finally, n-butanol (2 parts) was added to deactivate any remaining isocyanate groups and the reaction continued at 70° C. under nitrogen for a further 1 hour. On cooling, the product was obtained as a clear liquid (90 parts) with a solids content of 39.54% by weight. This is Dispersant 3.

Comparative Example C
Dod ε-Cap (1:5)/Desmodur IUPEG 1000 PA (1:1)/ 2-amino-4-methylpyridine This was prepared in identical manner to Dispersant 3 of Example 3 except using TPOAC 6 (20.53 parts) in place of the TPOAC 5. The product, Dispersant C, was obtained as a slightly hazy pale yellow liquid (90 parts) with a solids content of 39.54% by weight.

Example 4
Dod ε-Cap δ-Val (1:3:2)/Desmodur N/PEG 1000/3-aminopropanol

TPOAC 5 (9.18 parts), Desmodur N (8.8 parts ex Bayer) and xylene (23.3 parts) were stirred with dibutyl tin dilaurate (0.01 part) at 80° C. under nitrogen for 2 hours. Polyethyleneglycol (PEG 1000, 3 parts ex Aldrich) was added with xylene (41.3 parts) and the reactants stirred for 2 hours at 80° C. under nitrogen. Finally, 3-aminopropanol (1.5 parts ex Aldrich) was added with xylene (3.2 parts) and the reactants stirred for a further 2 hours at 80° C. On cooling, the product was obtained as a clear solution with a solids content of 25% in xylene. This solution was concentrated to give a solids content of 30% by weight in xylene. This concentrate is Dispersant 4.

Comparative Example D
Dod ε-Cap (1:5)/Desmodur N/PEG 1000/3-aminopropanol

This was prepared in identical manner to Dispersant 4 of Example 4 except using TPOAC 6 (9.52 parts) in place of the TPOAC 5. The product was obtained as a clear liquid with a solids content of 25% in xylene. As with Example 4, this was concentrated to give a solids content of 30% by weight in xylene. This concentrate is Dispersant D.

Example 5
Dod ε-Cap δ-Val (1:3:2)/Desmodur IL/PEG 1000 MA (1:2)/3-amino-1,2,4-triazole TPOAC 5 (11.66 parts), Desmodur IL (31.5 parts as a 51% solution in ethylacetate ex Bayer), butylacetate (15 parts), methoxypropylacetate (14 parts), Diacid 1 (5.32 parts) and tin octanoate (0.02 parts ex Elementis) were stirred at 70° C. under nitrogen for 2 hours. After cooling to 50° C., 3-amino-1,2,4-triazole (1.68 parts ex Aldrich) was added dissolved in N-methylpyrrolidine (9.53 parts) and stirred for a further 1 hour at 50° C. under nitrogen. Finally, n-butanol (3.37 parts) was added to deactivate any remaining isocyanate groups by stirring for a further 1 hour at 50° C. under nitrogen. On cooling, the product, Dispersant 5, was obtained as a pale yellow liquid (85 parts) and having a solids content of 37% by weight.

Comparative Example E
Dod ε-cap (1:5)/Desmodur IUPEG 1000 MA (1:2)/3-amino-1,2,4-triazole This was prepared in identical manner to Dispersant 5 of Example 5 except using TPOAC 6 (12.11 parts) in place of the TPOAC 5. After cooling, the product, Dispersant E, was obtained as a pale yellow liquid (85 parts) and again having a solids content of 37% by weight.

Examples 6 to 10 and Comparative Examples F to J

Aliquots (10 parts) of the solvent concentrates of Dispersants 1 to 5 and A to E were stored at 20° C., 4° C. for 5 days and −10° C. for 5 days respectively, and examined visually for separation. Samples stored at −10° C. for 5 days were also inspected after being allowed to return to 20° C. The results are given in Table 1 below.

TABLE 1

| Example/Comparative Example | Dispersant | Appearance of Solution | | | |
|---|---|---|---|---|---|
| | | At 20° C. | After 5 days at 4° C. | After 5 days at −10° C. | After 5 days at −10° C. and returning to 20° C. |
| 6 | 1 | Clear | Clear | Clear | Clear |
| F | A | Clear | Clear | Few Crystals | Clear |
| 7 | 2 | Clear | Clear | Clear | Clear |
| G | B | Clear | Clear | Crystals | Clear |
| 8 | 3 | Clear | Clear (gel) | Crystals | Clear |
| H | C | Clear | Crystals | Crystals | Clear |
| 9 | 4 | Clear | Clear | Clear | Clear |
| I | D | Clear | Few Crystals | Crystals | Clear |
| 10 | 5 | Clear | Clear (slight gel) | Clear | Clear |
| J | E | Clear | Clear (slight gel) | Crystals | Clear |

Examples 11 to 15 and Comparative Examples K to O

The dispersant was dissolved in a 4:1 mixture of methoxypropylacetate/n-butanol (MPA/BuOH) in the amounts shown in Table 2 below by warming as necessary. 3 mm Glass beads (17 parts) were added together with Chromophthal Red A2B (1.25 parts ex Ciba Geigy). The dispersion was then milled on a horizontal shaker for 16 hours. The fluidity of the resultant dispersions was assessed by hand shaking using an arbitrary scale of A to E (good to poor). The results are shown in Table 2.

TABLE 2

| Example | Dispersant | Amount of Dispersant | | Amount of MPA/BuOH | Viscosity |
|---|---|---|---|---|---|
| | | Parts | Strength | | |
| 11 | 1 | 0.60 | 30% | 8.15 | C |
| K | A | 0.60 | 30% | 8.15 | C |
| 12 | 2 | 0.78 | 23% | 7.97 | B/C |
| L | B | 0.78 | 23% | 7.97 | A/B |
| 13 | 3 | 0.45 | 40% | 8.30 | A/B |
| M | C | 0.45 | 40% | 8.30 | A/B |
| 14 | 4 | 0.78 | 23% | 7.97 | C |
| N | D | 0.78 | 23% | 7.97 | C |
| 15 | 5 | 0.45 | 40% | 8.30 | C |
| O | E | 0.45 | 40% | 8.30 | C |

Examples 16 to 20 and Comparative Examples P to T

Similar dispersions were prepared to those described in Examples 11 to 15 except using Novoperm Yellow HR (1.5 parts ex Hoechst) in place of the Chromophthal Red A2B and using the amount of solvent mixture as shown in Table 3 below. The assessment of the resultant viscosity is also given in Table 3.

TABLE 3

| Example | Dispersant | Amount of Dispersant Parts | Strength | Amount of MPA/BuOH | Viscosity |
|---|---|---|---|---|---|
| 16 | 1 | 0.3 | 30% | 8.20 | C |
| P | A | 0.3 | 30% | 8.20 | C/D |
| 17 | 2 | 0.39 | 23% | 8.11 | C/D |
| Q | B | 0.39 | 23% | 8.11 | C |
| 18 | 3 | 0.23 | 40% | 8.27 | C |
| R | C | 0.23 | 40% | 8.27 | B/C |
| 19 | 4 | 0.39 | 23% | 8.11 | C |
| S | D | 0.39 | 23% | 8.11 | B/C |
| 20 | 5 | 0.23 | 40% | 8.27 | B/C |
| T | E | 0.23 | 40% | 8.27 | C |

Example 21

Oco ϵ-Cap δ-Val (1:10:5)/Desmodur IL/Monoamine Modifier 1/n-butanol/PHS

TPOAC 3 (21.62 parts, 0.0122 M), Desmodur IL (29.06 parts, 0.0334 M as 51% solution in ethyl acetate ex Bayer), butyl acetate (38 parts) and methoxy propyl acetate (parts) were stirred at 75° C. under a slow stream of nitrogen. Tin octanoate (0.01 parts) was added and the reactants were stirred at 75° C. for 2 hours. Polyhydroxystearic acid (PHS, 4.72 parts, MW 870, 0.0054 M ex Zeneca) was added and stirring continued at 75° C. for 2 hours. After cooling to 60° C., a solution of Monoamine Modifier 1 (2.5 parts) in N-methypyrrolidine (2.5 parts) was added with stirring over 2 minutes. The reactants were stirred for a further 1 hour at 60° C., then n-butanol (1.89 parts, 0.0255 M) was added and the reactants stirred for a further 1 hour at 60° C. Finally, butyl acetate was added (9.11 parts) to give a pale viscous liquid (110 parts) containing 38% solids. This is Dispersant 6.

Comparative Example U

Oco ϵ-Cap (1:15)/Desmodur IL/Monoamine Modifier 11/n-butanol/PHS

Example 21 was repeated except using TPOAC 4 (22.47 parts, 0.0122 M) in place of TPOAC 3. The product was obtained as a pale viscous liquid (110 parts) containing 38% solids. This is Dispersant F.

Example 22

Bu ϵ-Cap δ-Val (1:8:4.6)/Desmodur IL/PEG 200AEE

TPOAC 7 (6.45 parts, 0.00445 M), Desmodur IL (5.07 parts, 0.0058 M as 51% solution in ethyl acetate ex Bayer), dibutyltindilaurate (0.03 parts ex Aldrich) and xylene (6.87 parts) were stirred under an argon blanket for 2 hours at 80° C. Then polyethylene glycol MW 200 (PEG 200, 0.17 parts, 0.00085 M ex Aldrich) in xylene (12.9 parts) was added and stirred at 80° C. for 2 hours and then amino ethoxy ethanol (AEE, 0.5 part, 0.00475 M ex Aldrich) in xylene (1.07 parts) was added and the reaction continued by stirring at 80° C. for 1 hour. On cooling, the product was obtained as a pale yellow liquid (30 parts) containing 30% solids. This is Dispersant 7.

Comparative Example V

Bu ϵ-Cap (1:12.6)/Desmodur IUPEG 200/AEE

Example 22 was repeated except using TPOAC 2 (6.73 parts, 0.00445 M) in place of TPOAC 7. The product was obtained as a pale yellow liquid (30 parts) containing 30% solids. This is Dispersant G.

Example 23

EH ϵ-Cap δ-Val (1:5.6:2)/Desmodur N/PPG 1000/ABA

This was made in similar manner to Dispersant 7, Example 22 except using TPOAC 8 (4.34 parts, 0.00448 M), Desmodur N (3.23 parts, 0.0051 M as a 75% solution in ethoxy glycol acetate/xylene (1:1) ex Bayer), xylene (6.07 parts) and dibutyltindilaurate (0.03 parts). After stirring for 2 hours at 80° C., polypropylene glycol MW 1000 (PPG 1000, 0.4 parts, 0.0004 M ex Aldrich) in xylene (10.17 parts) was added and the reaction continued for 2 hours at 80° C. Finally, p-aminobenzoic acid (ABA, 1.03 parts, 0.0075 M ex Aldrich) in N-methylpyrrolidone (7.97 parts) was added and the reactants were stirred at 80° C. for 1 hour. After cooling, the product was obtained as a pale yellow liquid (30 parts) containing 25% solids. This is Dispersant 8.

Comparative Example W

EH ϵ-Cap (1:7.6)/Desmodur N/PPG 1000/ABA

Example 23 was repeated except using TPOAC 9 (4.47 parts, 0.0045 M) in place of TPOAC 8. The product was obtained as a pale yellow liquid (30 parts) containing 25% solids. This is Dispersant H.

Example 24

MeO PEG 550 ϵ-Cap 7-Me ϵ-Cap (1:6:2.8)/Desmodur L/PEG 1000/DIA This was made in similar manner to Dispersant 7, Example 22 except using TPOAC 10 (4.44 parts, 0.0028 M), Desmodur L (3.97 parts, 0.006 M as a 75% solution in ethylacetate ex Bayer), xylene (6.3 parts) and dibutyltindilaurate (0.03 part). After stirring at 80° C. for 2 hours under argon, polyethylene glycol MW 1000 (PEG 1000, 0.67 part, 0.00067 M ex Fluka) in xylene (11.27 parts) was added and the reactants were stirred at 80° C. for 2 hours. Finally, diisopropanolamine (DIA, 1.0 part, 0.0075 M ex Fisher) in a 2:3 mixture of xylene and N-methyl pyrrolidone (5.8 parts) was added and the reactants stirred at 80° C. for a further 1 hour. On cooling, the product was obtained as a pale yellow liquid (30 parts) containing 27% solids. This is Dispersant 9.

Comparative Example X

MeO PEG 550 ϵ-Cap (1:8.8)/Desmodur L/PEG 1000/DIA

Example 24 was repeated. except using TPOAC 11 (4.33 parts, 0.0028 M) in place of TPOAC 9. The product was obtained as a hazy liquid (30 parts) containing 27% solids. This is Dispersant I.

Example 25

MeO PEG 550 ϵ-Cap δ-Val (1:6:2.8)/Desmodur L/PEG 1000/DIA Example 24 was again repeated except using TPOAC 12 (4.22 parts, 0.0028 M) in place of TPOAC 10. The product was obtained as a hazy liquid (30 parts) containing 27% solids. This is Dispersant 10.

Example 26

PFD EH ϵ-Cap 7-Me ϵ-Cap (1:9.6:150:21)/Desmodur L/PTHF/AP

TPOAC 13 (3.68 parts, 0.0018 M), Desmodur L (2.4 parts, 0.00365 M as a 75% solution in ethylacetate ex Bayer) and xylene (4.83 parts) were stirred under argon for 2 hours at 80° C. Polytetrahydrofuran MW 1000 (PTHF, 0.97 parts, 0.00097 M, Terathane 1000 ex Aldrich) in xylene (9.5 parts) was added and the reactants were stirred at 80° C. for 2 hours. Finally, 3-aminopropanol (AP, 0.27 part, 0.0036 M ex Aldrich) in N-methylpyrrolidone (11.73 parts) was added and the reactants were stirred under argon for a further 1 hour at 80° C. The product was obtained as a clear liquid (30 parts) containing 20% solids. This is Dispersant 11.

Comparative Example Y
PFD EH ε-Cap (1:9.6:171)/Desmodur UPTHF/AP

Example 26 was repeated except using TPOAC 14 (3.63 parts, 0.0018 M) in place of the TPOAC 13. The product was obtained as a clear liquid (30 parts) containing 20% solids. This is Dispersant J.

Example 27
MeO PEG 750/Desmodur L/DD ε-Cap δ-Val (1:6:2.8)/ABA

Desmodur L (4.4 parts, 0.005 M as 75% solution in ethyl acetate ex Bayer), polyethyl glycol mono methylether MW 750 (MeO PEG 750, 2.9 parts, 0.0039 M ex Fluka) and xylene (5.1 parts) were stirred under argon for 2 hours at 80° C. Diol 3 (1.07 parts, 0.0009 M) was added in xylene (10.87 parts) and the reactants were stirred for a further 2 hours at 80° C. Finally, p-aminobenzoic acid (ABA, 1.03 parts, 0.0075 M) in N-methyl pyrrolidone (7.93 parts) was added and the reactants were stirred at 80° C. for a further 1 hour. The product was obtained as a yellow liquid (30 parts) containing 25% solids. This is Dispersant 12.

Comparative Example Z
MeO PEG 750/Desmodur L/DD ε-Cap (1:8.8)/ABA

Example 27 was repeated except using Diol 4 (1.1 parts, 0.0009 M) in place of Diol 3. The product was obtained as a yellow liquid (30 parts) containing 25% solids. This is Dispersant K.

Example 28
DD ε-Cap δ-Val (1:3:1)/Desmodur IL/PEG 1000 TCPA (1:1)/AT/Bu

TPOAC 15 (15.18 parts, 0.024 M), Desmodur IL (28.0 parts, 0.16 M as a 51% solution in ethyl acetate ex Bayer), butyl acetate (20.42 parts), methoxy propyl acetate (24.02 parts) and tin octanoate (0.01 part ex Elementis) were stirred under nitrogen at 70° C. Monoacid 2 (5.12 parts, 0.004 M) was added and the reactants were stirred at 70° C. for 2 hours under nitrogen. 3-amino-1,2,4-triazole (AT, 1.68 parts, 0.02 M ex Aldrich) in N-methylpyrrolidone (8.4 parts) was added and stirring at 70° C. continued for 1 hour. Finally, n-butanol (1.34 parts) was added and the reaction continued for a further 1 hour at 70° C. The product was obtained as a clear liquid (96 parts) containing 25% solids. This is Dispersant 13.

Comparative Example AA
DD ε-Cap (1:4)/Desmodur IL/PEG 1000 TCPA (1:1)/AT/Bu

Example 28 was repeated except using TPOAC 16 (7.76 parts, 0.012 M) in place of TPOAC 15 and also using half the amount of the other reactants used in Example 27. The product was obtained as a clear liquid (49 parts) containing 35% solids. This is Dispersant L.

Example 29
PE ε-Cap 4/6-Me ε-Cap (1:6.3:2)/Desmodur N/Ethomeen S15/AEP

TPOAC 17 (4.45 parts, 0.004 M), Desmodur,N (3.03 parts, 0.00475 M as a 75% solution in a 1:1 mixture of ethylene glycol acetate/xylene ex Bayer), xylene (3.33 parts), ethylene glycol acetate (5.9 parts) and dibutyltindilaurate (0.01 part) were stirred under argon at 50° C. for 2 hours. Ethomeen S15 (1.23 parts, 0.0025 M ex Akzo Chemie) dissolved in xylene (10 parts) was added and the reactants were stirred for 1 hour at 50° C. Finally, 4-(2-aminoethyl)pyridine (AEP, 0.5 part, 0.004 M ex TCI) was added, dissolved in N-methylpyrrolidone (5 parts) and the reactants were stirred for a further 1 hour at 50° C. The product was obtained as a clear liquid (30 parts) containing 25% solids. This is Dispersant 14. Ethomeen S15 is ethoxylated oleylamine ex Akzo Chemie.

Comparative Example AB
PE ε-Cap (1:8.3)/Desmodur N/Ethomeen S15/AEP

Example 29 was repeated except using TPOAC 18 (4:33 parts, 0.004 M) in place of TPOAC 17. The product was obtained as a clear liquid (30 parts) containing 25% solids. This is Dispersant M.

Example 30
E ε-Cap δ-Val (1:6.3:2)/Desmodur N/Ethomeen S15/AEP

Example 29 was repeated except using TPOAC 19 (4.22 parts, 0.004 M) in place of TPOAC 17. The product was obtained as a clear liquid (30 parts) containing 25% solids. This is Dispersant 15.

Example 31
PE εCap 7-Me-ε-Cap (1:7.3:1.2)/Desmodur N/Ethomeen S15/AEP

Example 29 was again repeated except using TPOAC 20 (4.49 parts, 0.004 M) in place of TPOAC 17. The product, Dispersant 16, was obtained as a clear liquid (30 parts) containing 25% solids.

Example 32
No ε-Cap δ-Val (1:30:12.5)/Desmodur HUPEG 400/HEP

TPOAC 21 (18.9 parts, 0.004 M), Desmodur HL (6.3 parts, 0.0073 M as a 60% solution in ethyl acetate ex Bayer), polyethyleneglycol MW 400 (PEG 400, 0.7 part, 0.00175 M), ethyleneglycol acetate (15 parts), xylene (36 parts) and dibutyltindilaurate (0.01 part) were stirred under nitrogen at 50° C. for 2 hours. 2-(2-Hydroxyethyl)pyridine (HEP, 0.9 part, 0.0073 M ex Aldrich) dissolved in xylene (22.19 parts) was then added and the reactants stirred at 60° C. for 1 hour. The product was obtained as a clear liquid (95 parts) containing 25% solids. This is Dispersant 17.

Comparative Example AC
No ε-Cap (1:42.5)/Desmodur HL/PEG 400/HEP

Example 32 was repeated except using TPOAC 22 (19.6 parts, 0.004 M) in place of TPOAC 21. The product was obtained as a clear liquid (95 parts) containing 25% solids. This is Dispersant N.

Example 33
OcO ε-Cap δ-Val (1:10:5)/Desmodur N/DDD/DAM

TPOAC 3 (16.26 parts, 0.0092 M), Desmodur N (7.2 parts, 0.0113 M as a 75% solution in a 1:1 mixture of ethyleneglycol acetate/xylene ex Bayer), ethyleneglycol acetate (10 parts), xylene (20 parts) and dibutyltindilaurate (0.01 part) were stirred under nitrogen for 2 hours at 60° C. Xylene (10 parts) was added followed by 1,12-diaminododecane (DDD, 0.8 part, 0.004 M ex Aldrich) dissolved in N-methylpyrrolidone (10 parts). The reactants were stirred at 60° C. for a further 2 hours. Finally, N,N-diallylmelamine (DAM, 1.9 parts, 0.009 M ex Aldrich) dissolved in N-methylpyrrolidone (10 parts) and xylene (13.2 parts) was added and the reactants stirred for 1 hour at 70° C. On cooling the product was obtained as a clear gel (96 parts) containing 25% solids. This is Dispersant 18.

Comparative Example AD
OcO ε-Cap (1:15)/Desmodur N/DDD/DAM

Example 33 was repeated except using TPOAC 4 (16.9 parts, 0.0092 M) in place of TPOAC 3. After cooling, Dispersant O was obtained as a clear gel (96 parts) containing 25% solids.

Example 34

DD ε-Cap δ-Val (1:3:1)/TD/HD (2:4:3)

TPOAC 15 (35 parts, 0.056 M), 2,4-tolylenediisocyanate (TD, 19.39 parts, 0.111 M ex Aldrich), 1,6-hexanediol (HD, 9.87 parts, 0.083 M ex Aldrich) and tin octanoate (0.25 parts ex Elementis) were stirred at 100° C. under nitrogen for 6 hours. The product was obtained as a creamy viscous liquid giving a white paste on cooling (60 parts). This is Dispersant 19.

Comparative Example AE

DD ε-Cap (1:4)/TD/HD (2:4:3)

Example 34 was repeated except using TPOAC 16 (35 parts, 0.054 M) in place of TPOAC 15. The product, Dispersant P, was obtained as a cream gum (60 parts).

Examples 35 to 47 and Comparative Examples AF to AO

Aliquots (10 parts) of the dispersants were examined after storage for 16 hours at 20° C., 48 hours at 4° C., 72 hours at −10° C. and 72 hours at −10° C. and then allowed to return to 20° C. The results are given in Table 4 below.

TABLE 4

| | | Storage | | | |
|---|---|---|---|---|---|
| Example | Dispersant | 16 Hours at 20° C. | 48 Hours at 4° C. | 72 Hours at −10° C. | 72 Hours at −10° C. then Warming to 20° C. |
| 35 | 7 | Cl | Cl | Cl | Cl |
| AF | G | Cl | C | C | C |
| 36 | 8 | Cl | Cl | Cl | Cl |
| AG | H | Cl | Cl | C | Cl |
| 37 | 9 | Cl | C | C | Cl |
| 38 | 10 | Cl | C | C | Cl |
| AH | I | H | C | C | C |
| 39 | 11 | Cl | Cl | Cl | Cl |
| AI | J | Cl | Cl | C | Cl |
| 40 | 12 | Cl | Cl | Cl | Cl |
| AJ | K | Cl | Cl | C | Cl |
| 41 | 13 | Cl | Cl | Cl | Cl |
| AK | L | Cl | Cl | C | Cl |
| 42 | 14 | Cl | Cl | Cl | Cl |
| 43 | 15 | Cl | Cl | Cl | Cl |
| 44 | 16 | Cl | Cl | Cl | Cl |
| AL | M | Cl | Cl | C | Cl |
| 45 | 17 | Cl | Cl | Cl | Cl |
| AM | N | H | C | C | C |
| 46 | 18 | Cl G | Cl G | W G | Cl G |
| AN | O | Cl G | Cl G | W G | Cl G |
| 47 | 19 | Cl | Cl | Cl | Cl |
| AO | P | Cl | Cl | C | Cl |

Footnote to Table 4
Cl is clear, C is crystals present, H is hazy, G is gel and W is white.

Examples 48 to 59 and Comparative Examples AP to AZ

Dispersions containing 0.18 parts dispersant (active ingredient), Chromophthal Red A2B pigment ex Ciba-Geigy (1.25 parts) in a 4:1 mixture of methoxypropyl acetate/n-butanol (MPA/BuOH) were prepared by milling in the presence of 3 mm glass beads (17 parts) using a horizontal shaker for 16 hours. The viscosity of the resulting dispersions was assessed by hand-shaking using an arbitrary scale A to E (good to poor). The results are given in Table 5 below. Table 5 also lists the actual amount of dispersant and amount of MPA/BuOH solvent.

TABLE 5

| Example | Dispersant | % Solids | Amount of Dispersant | Amount of MPA/BuOH | Viscosity |
|---|---|---|---|---|---|
| 48 | 7 | 30 | 0.6 | 8.15 | C/D |
| AP | G | 30 | 0.6 | 8.15 | C |
| 49 | 8 | 25 | 0.72 | 8.03 | C |
| AQ | H | 25 | 0.72 | 8.03 | C |
| 50 | 9 | 27 | 0.67 | 8.08 | C |
| 51 | 10 | 27 | 0.67 | 8.08 | D |
| AR | I | 27 | 0.67 | 8.08 | C |
| 52 | 11 | 20 | 0.90 | 7.85 | D/E |
| AS | J | 20 | 0.90 | 7.85 | C |
| 53 | 12 | 25 | 0.72 | 8.03 | A |
| AT | K | 25 | 0.72 | 8.03 | A |
| 54 | 13 | 35 | 0.52 | 8.23 | C |
| AU | L | 35 | 0.52 | 8.23 | C |
| 55 | 14 | 25 | 0.72 | 8.03 | C |
| 56 | 15 | 25 | 0.72 | 8.03 | C/D |
| 57 | 16 | 25 | 0.72 | 8.03 | C/D |
| AV | M | 25 | 0.72 | 8.03 | C |
| 58 | 17 | 25 | 0.72 | 8.03 | D |
| AX | N | 25 | 0.72 | 8.03 | D |
| 59 | 18 | 25 | 0.72 | 8.03 | C |
| AY | O | 25 | 0.72 | 8.03 | C |
| 60 | 19 | 100 | 0.18 | 8.57 | B/C |
| AZ | P | 100 | 0.18 | 8.57 | C |
| Control | — | — | — | 8.75 | E |

Examples 61 to 73 and Comparative Examples AB to BJ

Dispersions containing 1.5 parts Novaperm Yellow HR ex Hoechst were prepared in similar manner to those containing Chromophthal Red A2B using the amounts of dispersant and solvent mixture indicated in Table 6 below.

TABLE 6

| Example | Dispersant | % Solids | Amount of Dispersant | Amount of MPA/BuOH | Viscosity |
|---|---|---|---|---|---|
| 61 | 7 | 30 | 0.30 | 8.2 | C/D |
| BA | G | 30 | 0.30 | 8.2 | C/D |
| 62 | 8 | 25 | 0.36 | 8.14 | C |
| BB | H | 25 | 0.36 | 8.14 | C |
| 63 | 9 | 27 | 0.34 | 8.16 | C |
| 64 | 10 | 27 | 0.34 | 8.16 | C/D |
| BC | I | 27 | 0.34 | 8.16 | D |
| 65 | 11 | 20 | 0.45 | 8.05 | C |
| BD | J | 20 | 0.45 | 8.05 | C/D |
| 66 | 12 | 25 | 0.36 | 8.14 | C |
| BE | K | 25 | 0.36 | 8.14 | C |
| 67 | 13 | 35 | 0.26 | 8.24 | B/C |
| BF | L | 35 | 0.26 | 8.24 | B |
| 68 | 14 | 25 | 0.36 | 8.14 | B/C |
| 69 | 15 | 25 | 0.36 | 8.14 | B/C |
| 70 | 16 | 25 | 0.36 | 8.14 | B |
| BG | M | 25 | 0.36 | 8.14 | C |
| 71 | 17 | 25 | 0.36 | 5.14 | B |
| BH | N | 25 | 0.36 | 8.14 | B/C |
| 72 | 18 | 25 | 0.36 | 8.14 | B |
| BI | O | 25 | 0.36 | 8.14 | B/C |
| 73 | 19 | 100 | 0.1 | 8.4 | B/C |
| BJ | P | 100 | 0.1 | 8.4 | C |
| Control | — | — | — | 8.5 | E |

What is claimed is:

1. A dispersant comprising the addition reaction product of a polyisocyanate having an average fttnctionality of from 2 to 10 and one or more poly(oxyalkylenecarbonyl) chains (POAC chain) derived from two or more different hydroxy carboxylic acids or lactones thereof, including their salts and a polymerisation terminating group which is a $C_{1-35}$-hydrocarbyl group which may be aromatic, alicyclic, heterocyclic or linear or branched saturated aliphatic, optionally substituted by halogen, $C_{1-6}$-alkoxy, ester, amide, urethane and ether groups.

2. A dispersant as claimed in claim 1, wherein the POAC chain is derived from two different hydroxy carboxylic acids or lactones thereof.

3. A dispersant as claimed in either claim 1 or claim 2 wherein the hydroxy carboxylic acids or lactones thereof contain a $C_{1-6}$-alkylene group.

4. A dispersant as claimed in claim 1, wherein the hydroxy carboxylic acids are 6-hydroxy caproic acid and 5-hydroxy valeric acid.

5. A dispersant as claimed in claim 1, wherein the lactone is δ-valerolactone or ε-caprolactone optionally substituted by $C_{1-8}$-alkyl.

6. A dispersant as claimed in either claim 1 or claim 2, wherein the POAC chain is derived from one or more TPOAC alcohols of formula 1

$$T[-(CO-A-O)_n(CO-B-O)_m]H \qquad (1)$$

wherein

T is a chain terminating group;

A and B are different $C_{1-17}$-alkylene;

n and m are integers; and n+m is from 2 to 200.

7. A dispersant comprising the addition reaction product of a polyisocyanate having an average functionality of from 2 to 10 and one or more poly(oxyalkylenecarbonyl) chains (POAC chain) derived from two or more different hydroxy carboxylic acids or lactones thereof, including their salts and optionally a polymerisation terminating group with is a C1-35-hydrocarbyl group which may be aromatic, alicyclic, heterocyclic or linear or branched saturated aliphatic, optionally substituted by halogen, $C_{1-6}$-alkoxy, ester, amide, urethane and ether groups, wherein each polyisocyanate contains one or more POAC chains provided that there remain two isocyanate groups which are not reacted with the POAC chains one of which isocyanate groups is reacted with a cross-linker and the other of which is reacted with a modifier.

8. A dispersant as claimed in claim 7 wherein the cross-linker is a compound of formula 2

$$D-(E)_p \qquad (2)$$

wherein

E is OH, $NH_2$ or NH R;

D is an aliphatic, cycloaliphatic and/or aromatic group having a molecular weight of not greater than 3000 and which contains two or more carbon atoms and may contain ether, thioether, ester (i.e. OCO), amide, urethane, sulphone or $-Si(CH_3)_2$ O-groups;

R is $C_{1-8}$-alkyl; and p is 2 or 3.

9. A dispersant as claimed in either claim 7 or claim 8 wherein the modifier is of formula Z—Q wherein Q is hydroxy, amino, $NHR^1$ or SH;

$R^1$ is $C_{1-8}$-alkyl; and

Z is an aliphatic group with from 2 to 10 carbon atoms containing at least one tertiary amino group or a heterocyclic group containing at least one basic ring nitrogen atom which contains no hydrogen atom and where the heterocyclic group may be attached to Q by an alkylene group containing up to 10 carbon atoms.

10. A dispersant as claimed in claim 7, wherein the reaction between the polyisocyanate and the POAC chain or TPOAC alcohol results in the reaction of from 15 to 50% of the available isocyanate groups.

11. A dispersant as claimed in claim 10, wherein a further 15 to 45% of the isocyanate groups initially present react with a cross-linker.

12. A dispersant as claimed in either claim 7 or claim 8 wherein the modifier is a compound of formula K—L or K—NH—K wherein L is OH, $NH_2$, $NHR^2$ or SH;

$R^2$ is $C_{1-4}$-alkyl; and

K is an aliphatic, cycloaliphatic or aromatic residue having at least one acidic functional group and/or at least one OH group and/or at least one $-Si(OR^3)_t(R^4)_{3-t}$-group;

$R^3$ and $R^4$ is $C_{1-10}$-alkyl; and t is from 1 to 3.

13. A dispersant as claimed in claim 12 wherein at least 0.8 moles of the compound of formula K—L and/or K—NH—K is provided for each isocyanate group which is not reacted with the POAC chain or cross-linker.

14. A dispersant as claimed in claim 12, wherein from 10 to 70% of the isocyanate groups in the polyisocyanate are reacted with the POAC chain or TPOAC alcohol.

15. A dispersant as claimed in claim 12, wherein from 1 to 50% of the isocyanate groups are further reacted with the cross-linker.

16. A dispersant as claimed in claim 12, wherein any isocyanate groups which are not reacted with the POAC chain or cross-linker are reacted with a polycarboxylic acid containing at least two carboxylic acid groups or anhydrides thereof.

17. A dispersant comprising the addition reaction product of a polyisocyanate having an average functionality of from 2 to 10 and one or more poly(oxyalkylenecarbonyl) chains (POAC chain) derived from two or more different hydroxy carboxylic acids or lactones thereof, including their salts and optionally a polymerisation terminating group with is a $C_{1-35}$-hydrocarbyl group which may be aromatic, alicyclic, heterocyclic or linear or branched saturated aliphatic, optionally substituted by halogen, $C_{1-6}$-alkoxy, ester, amide, urethane and ether groups, wherein the polyisocyanate is further reacted with (B) a mixture from ($B_1$) a TPOAC alcohol and ($B_2$) a monohydroxy monocarboxylic acid or monoamino monocarboxylic acid and (C) a compound containing at least one basic ring nitrogen and an isocyanate-reactive group.

18. A dispersant as claimed in claim 17 wherein between 30 and 70% of the isocyanate groups are reacted with (B) and between 30 and 70% of the isocyanate groups are reacted with (C).

19. A dispersant comprising the addition reaction product of a polyisocyanate having an average functionality of from 2 to 10 and one or more poly(oxyalkylenecarbonyl) chains (POAC chain) derived from two or more different hydroxy carboxylic acids or lactones thereof, including their salts and optionally a polymerisation terminating group with is a $C_{1-35}$-hydrocarbyl group which may be aromatic, alicyclic, heterocyclic or linear or branched saturated aliphatic, optionally substituted by halogen, $C_{1-6}$-alkoxy, ester, amide, urethane and ether groups, wherein the polyisocyanate is reacted with (B) one or more POAC chains or TPOAC alcohols, (C) a dicarboxylic acid compound and (D) a compound containing at least one basic ring nitrogen atom and a isocyanate reactive group.

20. A dispersant as claimed in claim 19 wherein from 30 to 70% of the isocyanate groups are reacted with (B) and (C) together and from 30 to 70% of the isocyanate groups are reacted with (D).

21. A dispersant as claimed in either claim 19 or claim 20, wherein the dicarboxylic acid compound is obtained by reacting a diol with a dicarboxylic acid or anhydride thereof.

22. A dispersant comprising the addition reaction product of a polyisocyanate having an average functionality of from 2 to 10 and one or more poly(oxyalkylenecarbonyl) chains (POAC chain) derived from two or more different hydroxy carboxylic acids or lactones thereof, including their salts and optionally a polymerisation terminating group with is a $C_{1-35}$-hydrocarbyl group which may be aromatic, alicyclic, heterocyclic or linear or branched saturated aliphatic, optionally substituted by halogen, $C_{1-6}$-alkoxy, ester, amide, urethane and ether groups and, which contains one or more POAC chains or TPOAC alcohols and a modifier which is a heterocyclic compound which contains at least one nitrogen atom which is obtained by reacting an acrylate or epoxide with the heterocyclic ring system.

23. A dispersant as claimed in claim 22 wherein the heterocyclic compound is a compound of formula P—Q—W
wherein
P is a heterocyclic structure containing at least one nitrogen atom;
Q is a chain containing at least three atoms;
W is a group $OR^5$ or $NR^5R^6$;
$R^5$ is H or a group $R^7$-$L^1$;
$R^7$ is a chain with at least two atoms;
$L^1$ is OH or $NH_2$; and
$R^6$ is $R^7$-$L^1$.

24. A dispersant as claimed in claim 23 wherein Q has a carbonyl group at the γ-position with respect to P.

25. A dispersant as claimed in claim 22, where the polyisocyanate is reacted with a cross-linker which is a diol, diamine, dicarboxylic acid and/or mono-hydroxy carboxyl acid.

26. A dispersant as claimed in claim 25 wherein from 40 to 80% of the isocyanate groups in the polyisocyanate are reacted with the POAC compound or TPOAC alcohol and the cross-linker.

27. A dispersant as claimed in claim 22, wherein from 20 to 60% of the isocyanate groups are reacted with the heterocyclic compound as modifier.

28. A composition comprising a particulate solid and a dispersant comprising the addition reaction product of a polyisocyanate having an average functionality of from 2 to 10 and one or more poly(oxyalkylene carbonyl), chains (POAC chain) derived from two or more different hydroxy carboxylic acids or lactones thereof, including their salts.

29. A dispersion comprising a particulate solid, organic medium and a dispersant comprising the addition reaction product of a polyisocyanate having an average functionality of from 2 to 10 and one or more poly(oxyalkylene carbonyl) chains (POAC chain) derived from two or more different hydroxy carboxylic acids or lactones thereof, including their salts.

30. A millbase comprising a particulate solid, film-forming binder resin, organic medium and a dispersant comprising the addition reaction product of a polyisocyanate having an average functionality of from 2 to 10 and one or more poly(oxyalkylene carbonyl) chains (POAC chain) derived from two or more different hydroxy carboxylic acids or lactones thereof, including their salts.

31. A paint or printing ink comprising a dispersion as claimed in claim 29 or a millbase as claimed in claim 30.

32. A dispersant as claimed in claim 1 wherein the polymerisation terminating group is derived from a $C_{1-35}$-alkyl alcohol which may be linear or branched.

33. A dispersant comprising the addition reaction product of a polyisocyanate having an average functionality of from 2 to 10 and one or more poly(oxyalkylenecarbonyl) chains (POAC chains) derived from two or more different hydroxy carboxylic acids or lactones thereof and a polymerisation terminating group of formula T—OH where T is $C_{1-35}$-hydrocarbyl optionally substituted by halogen, $C_{1-6}$-alkoxy, ester, amide, urethane and ether groups.

* * * * *